US009084140B2

(12) United States Patent
Holland

(10) Patent No.: US 9,084,140 B2
(45) Date of Patent: Jul. 14, 2015

(54) MONITORING OF THE PACKET-BASED COMMUNICATION PERFORMANCE OF IP ADDRESS POOLS

(71) Applicant: CELLCO PARTNERSHIP, Basking Ridge, NJ (US)

(72) Inventor: David E. Holland, White Lake, MI (US)

(73) Assignee: Cellco Partnership, Basking Ridge, NJ (US)

( * ) Notice: Subject to any disclaimer, the term of this patent is extended or adjusted under 35 U.S.C. 154(b) by 188 days.

(21) Appl. No.: 13/937,848

(22) Filed: Jul. 9, 2013

(65) Prior Publication Data

US 2015/0016274 A1 Jan. 15, 2015

(51) Int. Cl.
*H04W 24/04* (2009.01)
*H04L 12/26* (2006.01)
*H04W 24/00* (2009.01)

(52) U.S. Cl.
CPC ............ *H04W 24/04* (2013.01); *H04L 43/106* (2013.01); *H04W 24/00* (2013.01)

(58) Field of Classification Search
CPC ....... H04W 24/00; H04W 24/04; H04W 8/00; H04W 8/18; H04W 8/22
See application file for complete search history.

(56) References Cited

U.S. PATENT DOCUMENTS

| | | | |
|---|---|---|---|
| 2002/0155827 A1* | 10/2002 | Agrawal et al. ............... | 455/414 |
| 2006/0047835 A1* | 3/2006 | Greaux ......................... | 709/229 |
| 2012/0005446 A1* | 1/2012 | Furuhashi ..................... | 711/170 |

* cited by examiner

*Primary Examiner* — Anh Ngoc Nguyen

(57) ABSTRACT

An IP address pool monitor is communicatively coupled to a communication link carrying packets between a mobile wireless communication network and a wide area network. The pool monitor receives requests transmitted by mobile devices over the communication link to the wide area network, and stores a record for each request. The pool monitor also receives responses transmitted back to the mobile devices responsive to each request. Each mobile device is assigned an IP address from one of a plurality of IP address pools. Upon receiving a response, the pool monitor identifies the IP address pool that includes the IP address of the mobile device associated with the request responsive to which the response was transmitted. The pool monitor then calculates a performance statistic for the identified IP address pool based on the stored record of the request and the received response.

17 Claims, 5 Drawing Sheets

US 9,084,140 B2

MONITORING OF THE PACKET-BASED COMMUNICATION PERFORMANCE OF IP ADDRESS POOLS

BACKGROUND

In recent years, network communication services have expanded and increased in popularity around the world. Many advanced networks offer mobile wireless communication services for voice calls, messaging services, and data communications. The data communication services enable users of mobile communication devices to surf the world wide web via web browsers, for example, as well as enable applications running on the communication devices to connect to remote network devices or servers to upload or download content and information.

To support the increased popularity of data communications services, operators of mobile wireless communication networks have had to expand the capacity of their networks. The increased capacity is typically provided by adding additional base stations, routers, gateways, and switches to the networks, to enable the network to serve more mobile devices, or to provide more communications capacity for each mobile device.

The network's use of supplementary and duplicative systems, however, makes it harder to identify when failures occur within the network. For example, a network may include multiple serving gateways used to handle network traffic, the serving gateways dividing amongst themselves a large volume of network traffic. If a failure occurs in one of the serving gateways, only a small portion of the network traffic will be affected as the remaining serving gateways continue to function properly and handle new requests. Network administrators may therefore not become aware of the failure, and may therefore fail to address the failure promptly.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
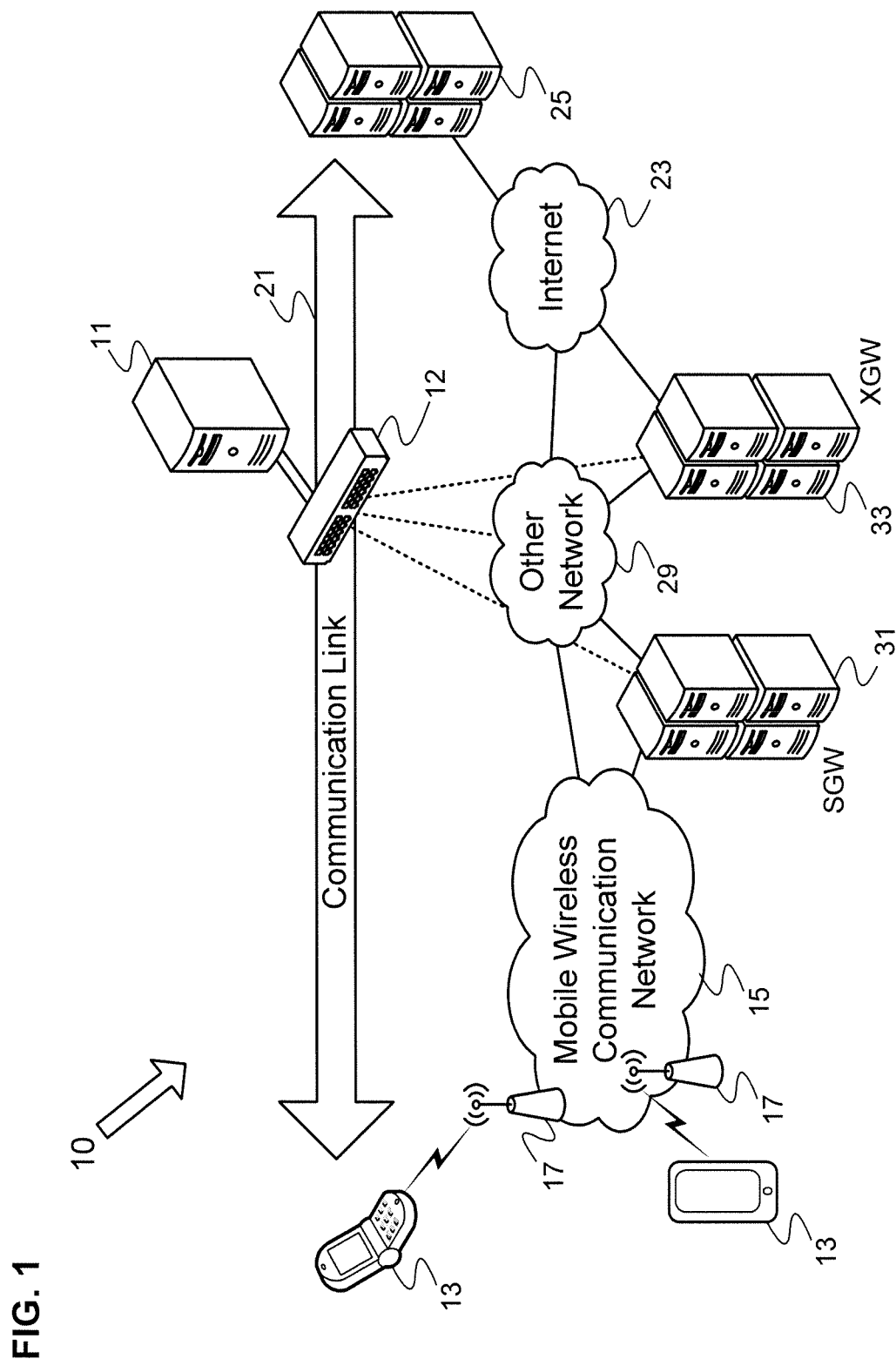
FIG. 1 is a high-level functional block diagram of a system of networks/devices that provide various data communications for mobile devices and support the monitoring of communication performance of IP address pools.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various methods and systems disclosed herein relate to the monitoring of communication performance of IP address pools. In particular, the methods and systems provide for the monitoring of a plurality of IP address pools each including IP addresses used by mobile devices to communicate through a mobile wireless communication network with a wide area network such as the Internet.

In order to monitor the communication performance of IP address pools, an IP address pool monitor is communicatively coupled to a communication link between a mobile wireless communication network and a wide area network. The IP address pool monitor monitors request packets transmitted from mobile devices through the mobile wireless communication network to the wide area network, and response packets transmitted in response to the requests from the wide area network to the mobile devices. The request and response packets may be request/response packets associated with TCP, HTTP, DNS, UDP, SIP, SMTP, RTMP, or other appropriate communication protocols. The IP address pool monitor identifies the IP address pool associated with each request packet by identifying the IP address pool that includes the IP address of the mobile device associated with the request. The pool monitor then calculates a performance statistic for the identified IP address pool based on parameters of the request and of any previous requests and responses associated with the identified IP address pool.

An IP address pool can correspond to a set IP addresses (e.g., a range of IP addresses) that are assigned to mobile devices by a packet data network (PDN) gateway (PGW) or an extendable gateway (XGW). Different PGWs and XGWs have different IP address pools, such that the IP address assigned to a mobile device is indicative of the PGW or XGW through which the mobile device communicates. The pool monitor's real time monitoring of packets and calculation of performance statistics may thus enable the pool monitor to identify communication or other failures of particular PGWs and XGWs in real time. For example, the pool monitor may determine that communication failures (e.g., failed responses, requests that have timed out, or the like) are occurring at a high rate among IP addresses belonging to a particular IP address pool. The pool monitor may then issue an alert to a network administrator identifying the communication failure and the particular IP address pool. The alert may also identify particular network systems that are associated with the IP address pool, such as an PGW or XGW of the network. The pool monitor can also identify network servers that are failing user requests for data and provide identification of such servers in the alert, the network servers including both internal servers of an operator of the mobile wireless communication network and/or external web servers including commercial service provider servers (e.g., google.com servers, facebook.com servers, or the like). The IP address pool monitor can thus provide real-time alerts indicating the location of a failure in the communication network, thereby enabling a network administrator to promptly address the failures.

Reference now is made in detail to the examples illustrated in the accompanying drawings and discussed below.

FIG. 1 illustrates a system 10 that provides data communication services between mobile devices 13 connected to mobile wireless communication network 15 and application servers and web servers 25 connected to a wide area network such as the Internet 23. Communications between a mobile device 13 and a server 25 are routed along a communication link 21 that is established through the mobile wireless communication network 15, one or more private communication networks 29, and the Internet 23. The communication link is established via one or more of a mobile wireless communication base station 17, a serving gateway (SGW) 31 of the mobile wireless communication network, and a packet data network (PDN) gateway (PGW) or extendable gateway (XGW) 33 of the mobile wireless communication network 15.

The mobile wireless communication network 15 provides a variety of mobile communication services, including voice, messaging, and data services for users of mobile devices 13. While the example shows two mobile devices 13, the mobile wireless communication 15 provides communications services via a number of base stations 17 to large numbers of mobile devices including mobile telephones, smart-phones, wireless modems and air-cards, and the like. The present techniques may be implemented in any of a variety of available mobile networks 15 and/or with any type of mobile device 13 compatible with such a network 15, and the drawing shows only a very simplified example of a few relevant elements of the network 15 for purposes of discussion.

The mobile wireless communication network 15 might be implemented as a network conforming to standards such as the code division multiple access (CDMA) standard, 3rd Generation Partnership Project (3GPP) wireless IP network standards (e.g., 3G, 4G, LTE standards) or the Evolution Data Optimized (EVDO) standard, the Global System for Mobile (GSM) communication standard, a time division multiple access (TDMA) standard or other standards used for public mobile wireless communications. In addition to providing voice and messaging services, the network 15 provides data communication services to enabled mobile devices 13. The data communication services enable mobile devices 13 to access the Internet 23 and Internet-connected servers 25, and to perform downloads, web browsing, email, etc. The mobile devices 13 also can receive and execute applications that access the Internet 23.

The mobile wireless communication network 15 can be implemented by a number of interconnected networks. Hence, the overall network 15 may include a number of radio access networks (RANs), as well as regional ground networks interconnecting a number of RANs and a wide area network (WAN) interconnecting the regional ground networks to core network elements. A regional portion of the network 15, such as that serving mobile devices 13, can include one or more RANs and a regional circuit and/or packet switched network and associated signaling network facilities.

Physical elements of a RAN operated by one of the mobile service providers or carriers, include a number of base stations (BSs) 17. Although not separately shown, a base station 17 can include a base transceiver system (BTS) for communication via an antennae system with one or more of the mobile devices 13, and a cell-site router (CSR) for communication via a wired traffic network with other elements of network 15. The mobile wireless communication network (represented generally by the cloud at 15) carries user communications and data from and for the mobile devices 13 between the base stations 17 and other elements with or through which the mobile devices communicate.

The carrier also operates a number of systems that provide ancillary functions in support of the communications services and application services provided through the network 15, and those elements communicate with other nodes or elements of the network 15 via one or more private IP-type packet data networks 29 (sometimes referred to as an Intranet), i.e., private networks. Examples of such systems, in this case operated by the network service provider as part of the overall network 10, which communicate through the intranet type network 29, include application servers, authentication servers, and gateways.

In particular, in support of data communication services, the carrier can operate one or more serving gateways (SGWs) 31 and one or more packet data network (PDN) gateways (PGWs) or extendable gateways (XGWs) 33. The SGWs 31 route data packets that are transmitted to and from mobile devices 13 of the mobile wireless communication network 15. In general, all data packets associated with a particular mobile device 13 are routed through a particular SGW 31 that is associated with the mobile device 13, although the SGW 31 also routes data packets for multiple other mobile devices 13. In the case of uplink traffic, the SGW 31 receives data packets transmitted by the mobile device 13 through the network 15, and forwards the packets according to their intended destination. For example, the SGW 31 may forward the packets to a gateway associated with a network to which the intended destination server is connected. Each SGW 31 also monitors the mobility of the mobile devices 13 it is associated with. In the case of downlink traffic destined a mobile device 13, the SGW 31 thus determines which base station 17 the mobile device 13 is currently connected to, and forwards downlink data packets destined for the mobile device 13 to the appropriate base station 17, switch, or router.

The PGWs and XGWs (referenced generally herein as extendable gateway(s) XGW(s) 33) route user data packets to and from external packet data networks, such as the Internet 23. In general, a different PGW is used for each different type of external packet data network, while a single XGW may handle traffic for multiple different types of external networks. In order to support network load, the system 10 will generally include multiple XGWs 33, including multiple XGWs 33 providing connectivity to the Internet 23 and/or XGWs providing connectivity to other external networks (not shown). The XGWs 33 assign IP addresses to the mobile devices 13 to enable the mobile devices 13 to access and communicate on the external PDNs and the Internet 23. Specifically, in response to receiving in an XGW 33 a request from a mobile device 13 to access and/or establish a communication link with the PDN associated with the XGW, the XGW 33 assigns an IP address to the mobile device 13. The IP address is assigned by the particular XGW 33 having received the request, and is generally selected from a set of un-used IP addresses associated with the XGW 33. The set of IP addresses associated with the XGW 33 is referred to as an IP address pool, and mobile devices 13 may be assigned IP addresses from any of the plurality of IP address pools of the plurality of XGWs 33 of system 10. The IP address pool of each XGW 33 may include a large number of IP addresses, for example around 300,000 IP addresses.

In response to a mobile device 13 issuing a request to connect to a web server 25 in system 10, an IP address is assigned by an XGW 33 to the mobile device and a communication link 21 is established between the mobile device 13 and the web server 25. As illustratively shown in FIG. 1, the communication link 21 is established between the mobile device client and web server via a base station 17, the mobile wireless communication network 15, the private network 29, the SGW 31 associated with the mobile device 13, an XGW 33 associated with the Internet 23, and the Internet 23.

The system 10 additionally includes a IP address pool monitor 11. The IP address pool monitor 11 monitors the communication performance of each of the plurality of IP address pools used in the system 10, including the IP address pools associated with each of the plurality of XGWs 33. In order to effect the monitoring, the IP address pool monitor 11 is connected to one or more network tap(s) 12.

Network tap 12 is connected in the communication link 21, and is operative to send a copy of data packets communicated along the communication link 21 between the mobile device 13 and the web server 25 to the IP address pool monitor 11, while allowing each packet to proceed unimpeded to its intended destination. More generally, the network tap 12 is operative to send copies of data packets communicated between the mobile wireless communication network 15 and the Internet 23 to the IP address pool monitor 11, while allowing the packets to proceed unimpeded to their intended destinations in the mobile wireless communication network 15 or in the Internet 23.

In one example, the network tap 12 is linked to an SGW 31, and provides a copy of each packet of data flowing into or out of the SGW to the pool monitor 11. While a single network tap 12 is shown in FIG. 1, the system 10 generally includes a plurality of network taps 12. For instance, network taps 12 may be coupled to each of a plurality of SGWs 31 of system 10, and can thereby provide the pool monitor 11 with copies of all data packets communicated through the system 10. In another example, the network tap(s) 12 are linked to XGW(s) 33, and provide copies of all packets communicated through the XGW(s) 33 to the IP pool monitor 11. In yet another example, the network tap(s) 12 are linked to the private network 29, and provide copies of packets communicated through the network 29 to the IP pool monitor 11.

In response receiving the copies of data packets from the network tap(s) 12, the IP address pool monitor 11 evaluates the performance of each of the plurality of IP address pools of system 10. Details of the performance evaluation performed by the monitor 11 are discussed in more detail in relation to the flow diagram of FIG. 2.

Figure 2:
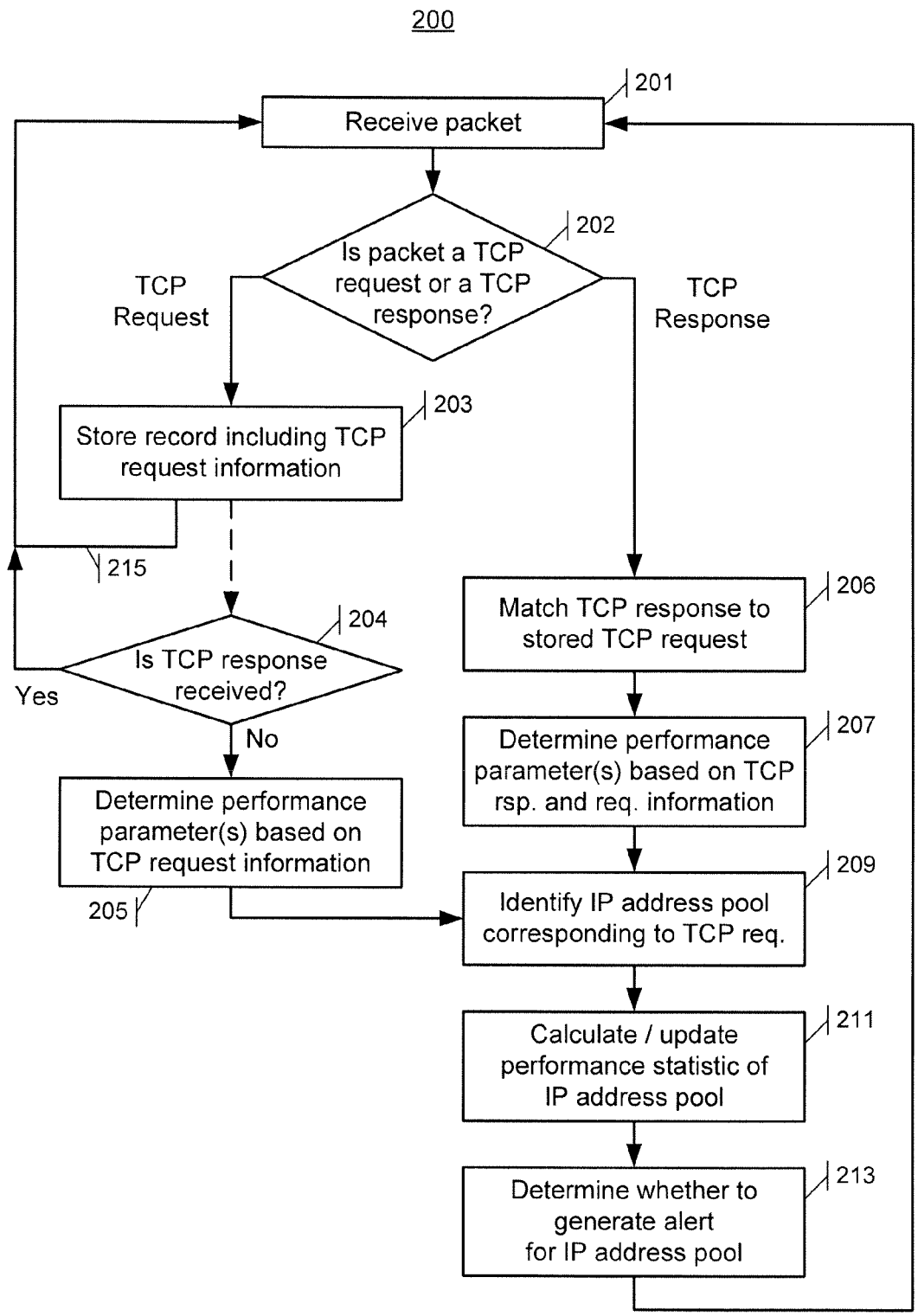
FIG. 2 is a flow diagram showing steps of a process for monitoring the communication performance of IP address pools.

FIG. 2 is a flow diagram showing steps of a process 200 for monitoring the communication performance of IP address pools. The steps of process 200 may be performed in an IP address pool monitor such as monitor 11 of system 10.

According to process 200, the IP address pool monitor 11 receives a packet in step 201. In response to receiving the packet, a determination is made as to whether the packet is a request packet or a response packet in step 202. The request and response packets may be request/response packets associated with any of the TCP, HTTP, DNS, UDP, SIP, SMTP, RTMP, or other appropriate communication protocols. A request packet generally corresponds to a request packet transmitted from a mobile device 13 through the mobile wireless communication network 15 to a server 25 of the Internet 23, and which is communicated along the communication link 21. A response packet generally corresponds to a response packet transmitted from a server 25 of the Internet 23 back to the mobile device 13 responsive to the request packet received by the server 25 from the mobile device 13, and which is also communicated along the communication link 21.

Upon determining that the received packet is a request packet in step 202, a record is stored in memory including request information, in step 203. The request packet has a header including an IP address of the source (e.g., the mobile device 13 having transmitted the request) and of the destination (e.g., the server 25), and a sequence number (e.g., a sequence number generated by the mobile device 13). Upon determining that the received packet is a request packet, the monitor 11 stores a record associated with the request in a memory of the monitor 11. The record can include the request packet, or information retrieved from the packet including the IP address of the source and the sequence number. The record further includes a timestamp for the request, such as a timestamp indicative of a time at which the request was received in the monitor 11, indicative of a time at which the request was transmitted by the mobile device 13, or the like.

Upon determining that the received packet is a response packet in step 202, the pool monitor proceeds to step 206. In step 206, the response packet is matched to a stored request record. To this end, the response packet includes identifiers for identifying the request packet in response to which the response packet was sent. For example, the response packet can include a sequence number that matches the sequence number found in the corresponding request packet, or matches an incremented version of the sequence number found in the corresponding request packet. Other identifiers, such as source and destination IP addresses or other data contained in the headers of the request and response packets can also be used to perform the matching. The pool monitor 11 can thus retrieve an appropriate identifier from the received response packet, and search stored records of previously received requests to locate a record matching with the identifier of the response. If no match is located, the process may end. However, if a match is located, the pool monitor 11 proceeds to step 207.

In step 207, upon locating the stored record matching the received response packet, one or more performance parameters are determined from the matched record and the first response packet. The performance parameters include information on a response success or failure, on a number of retransmissions that have taken place, on a connection or delay time, on any error codes received as part of the request or response, or the like. The performance parameters can further include error or success codes, identification of protocols used, or the like.

In one example, the performance parameter includes a response delay time measured as a delay between the timestamp of the stored record and a timestamp associated with the response, such as a timestamp corresponding to a time at which the response packet was received in the monitor 11 or sent from the server 25. In another example, the performance parameter includes an error code included in the response message, a count or other indicator included in the stored record or in the response and indicative of a number of retransmissions of the packet, or the like. One or multiple performance parameters can be determined in step 207.

At some time following the receipt of the request packet (e.g., in step 203), the pool monitor 11 should receive a response packet responsive to the request packet. For example in step 206, a response packet is received and is matched with the request (and with the record for the request) that the response corresponds to. Additionally, the response packet should be received within a timeout period following receipt of the request packet. In step 204, the pool monitor 11 determines whether the response packet is indeed received within the timeout period in response to a received request packet. If it is determined that the response packet has been received before expiration of the timeout period (step 204, "Yes"), processing continues at step 201.

However, if no response packet has been received before expiration of the timeout period (step 204, "No"), the pool monitor 11 can determine that a failure has occurred. For example, the pool monitor 11 may determine that the request packet failed to reach its intended destination server 25, that the server 25 failed to transmit a response packet responsive to the request packet, or that a response packet transmitted by the server 25 has been dropped, corrupted, lost, or otherwise did not reach the network tap 12.

In step 205, the pool monitor then determines the performance parameter(s) based on the request information stored in the record only. The performance parameter(s) determined in step 205 include performance parameter analogous to those outlined in step 207 above. In addition, however, the performance parameter(s) of step 205 can include parameters indicative of the failure to receive a corresponding response. Such parameters may include parameters indicative of the response failure or of a number of retransmissions that have taken place, and/or an error code indicative of the failure.

Whether or not a response is received, the IP address pool that includes the IP address of the mobile device associated with the request is identified in step 209. Specifically, step 209 is performed if the response packet is received before expiration of the timeout period following receipt of an associated request packet (step 204, "Yes", and steps 206-207). Step 209 is also performed if no response packet is received before expiration of the timeout period (step 204, "No", and step 205).

In step 209, the IP address pool that includes an IP address of the mobile device 13 associated with the request (and/or with the response) is identified. The IP address pool is identified from among a plurality of IP address pools, each IP address pool including a different non-overlapping set of IP addresses from the other IP address pools. To perform the identification, the pool monitor 11 stores a database associating each IP address included in the plurality of IP address pools with a respective IP address pool. The pool monitor 11 may assemble the information stored in the database by retrieving from each XGW 33 the information on the IP address pool of the individual XGW, or by retrieving from a network management server information on IP addresses associated with each of the plurality of IP address pools. The identification of the IP address pool corresponding to the request/response can be based on a source IP address retrieved from a header of the request or on a destination IP address retrieved from a header of the response. Generally, the retrieved IP address is the IP address assigned to the mobile device 13 having initiated the request and response communications.

Once the IP address pool is identified, performance statistics of the identified IP address pool are calculated or updated in step 211. In situations in which the performance statistics were previously calculated, they may be updated using the additional information provided by the request, response, and the associated performance parameters determined in steps 205 and 207. The performance statistics will be dependent on both the performance parameters determined in steps 205 and 207 and on information and performance parameters determined from previously-received requests and responses associated with the IP address pool. In situations in which the performance statistics were not previously calculated, they may be calculated using the request, response, and associated performance parameters only.

The performance statistics can include statistics on the total number of requests received for an IP address pool, and the numbers of responses successfully received. The statistics can further include numbers of failed responses, the number of timeouts (e.g., as determined in step 204), and numbers of retransmissions or lost packets. Such statistics can be kept for a limited time period (e.g., the last minute, 5 minutes, hour, or day), for a predefined time period (e.g., since the beginning of the current minute, the current hour, the current day, or since a last reset of the statistics), or for all time (e.g., since operation of the pool monitor 11 started).

The performance statistics can further include statistics on packet latency and delay times. The response latency or delay of an IP address pool can be computed as a delay between timestamps of a response and an associated request, for example. The performance statistics can further include data on peak or maximum delay.

The performance statistics can further include statistics on error codes received, and on other appropriate performance parameters of the IP address pools.

Once the performance statistics are calculated or updated, the IP address pool monitor 11 optionally determines whether an alert should be generated in step 213. The alert can thus be generated in real-time as soon as the performance statistics are updated. The alert can include alerts to system or network administrators regarding the current or past performance of any of the plurality of IP address pool. For example, if a performance statistic falls below a minimum threshold (or, alternatively, exceeds a maximum threshold), an alert identifying the IP address pool can be provided. An alert may thus be provided, for example, if a response delay consistently exceeds a threshold, or if numbers of retransmissions, of lost packets, of failed responses, or of timeouts exceed the threshold. The alert can identify the performance statistic having triggered the alert, and enable an administrator to obtain additional or more detailed information regarding the performance statistic and the communication performance of the identified IP address pool. The alert can further identify any systems associated with the IP address pool, such as an XGW 33 that is associated with and assigns IP addresses from the affected IP address pool.

In an example, the alert is generated in response to determining that a number or rate of packet failures detected during a current time interval has increased relative to the number or rate of packet failures detected during a previous time interval. For example, the alert is generated upon determining that a rate of errors in the current time interval (e.g., a period of 30 minutes) exceeds by more than 200% a baseline rate of errors measured over several previous time intervals. The alert can additionally or alternatively be generated upon determining that the number or rate of packet failures exceeds a predetermined threshold. The alert identifies the type of packet failure having been detected, as well as the address pool associated with the packet failures. In the example, the alert indicates that packets associated with an IPv6 communication protocol are experiencing high rates of failure. The alert can identify an address pool associated with a serving gateway (SGW) associated with IPv6 requests. The alert is generated even though packets associated with other communication protocols (e.g., IPv4) and other SGWs (e.g., an SGW associated with IPv4 requests) are successfully being routed through the network. In particular, the alert is generated even though the network is automatically re-routing failed IPv6 requests as IPv4 requests upon determining each IPv6 packet failure, such that end-users having generated the IPv6 requests are unaware of the underlying IPv6 failures. The alert may thus enable a network administrator to identify a source of packet failures even in situations in which other network monitoring systems (including systems monitoring packet success rates experienced by end-users) would not have identified the existence of packet failures or identified the IP address pool or SGW associated with the packet failures.

While the method 200 is illustratively shown as a linear process which may repeat itself following the completion of step 213, the process may not be performed linearly. For example, as shown at 215, multiple requests may be received and stored in step 203 in a short period of time and prior to the expiration of any timeout periods (of step 204). In such a situation, steps 201-203 may be performed repeatedly before any of the responses associated with the multiple requests are received (step 206) or are determined not to be received within the timeout period (step 204).

Additionally, the method 200 enables performance statistics for an IP address pool to be calculated (or updated) based on requests and responses received from/for a single mobile device (and/or from/for a single IP address of the pool). More generally, however, the performance statistics for an IP address pool are calculated based on requests and responses received from/for a large number of mobile devices using a large number of IP addresses of the pool.

Hence, in accordance with an illustrative embodiment of the system and methods described above, a system for monitoring communication performance of IP pools includes a network tap and a pool monitor. The network tap is coupled to a serving gateway (SGW) of a mobile packet data network, and is operative to provide copies of packets of data flowing into or out of the SGW to the pool monitor while allowing each packet of data flowing into or out of the SGW to proceed unimpeded to the packet's intended destination. The pool monitor includes a communication interface, a processor, and a memory. The memory stores IP address pool data associating each IP address included in a plurality of IP address pools with the particular IP address pool of the IP address. The communication interface is communicatively coupled to the network tap, and receives from the network tap the copies of packets of data flowing into or out of the SGW. For each copy of a request packet of data transmitted by a mobile communication device and received in the communication interface, the processor stores a record for the request in memory including an IP address of the mobile communication device having transmitted the request and a request time stamp. For each copy of a response packet of data transmitted to a mobile communication device and received in the communication interface, the processor identifies a record stored in memory for a request corresponding to the response; identifies an IP pool associated with the IP address of the mobile communication device having transmitted the request using the IP address pool data stored in the memory; and stores an updated record for the request including identification of the determined IP pool and information on the delay between the request time stamp and a response time stamp.

Figure 3A:
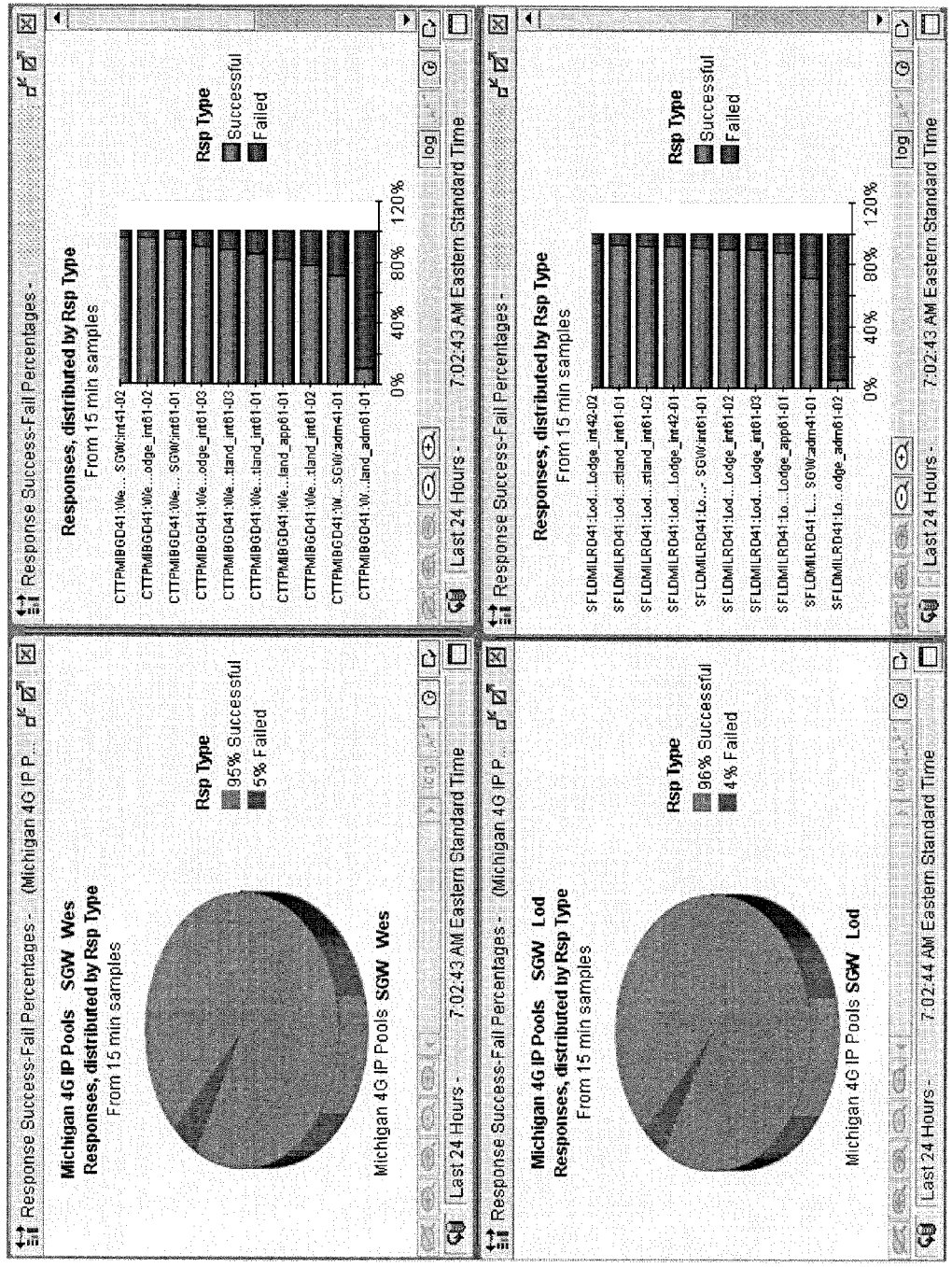
FIGS. 3A-3C are diagrams showing illustrative communication performance statistics for monitored IP address pools.
Figure 3B:
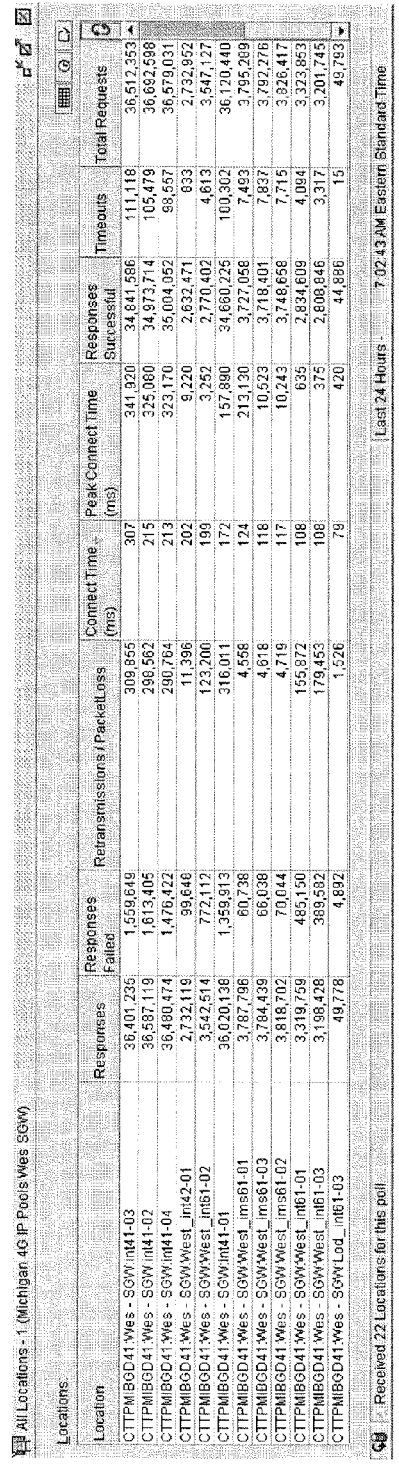
Figure 3C:
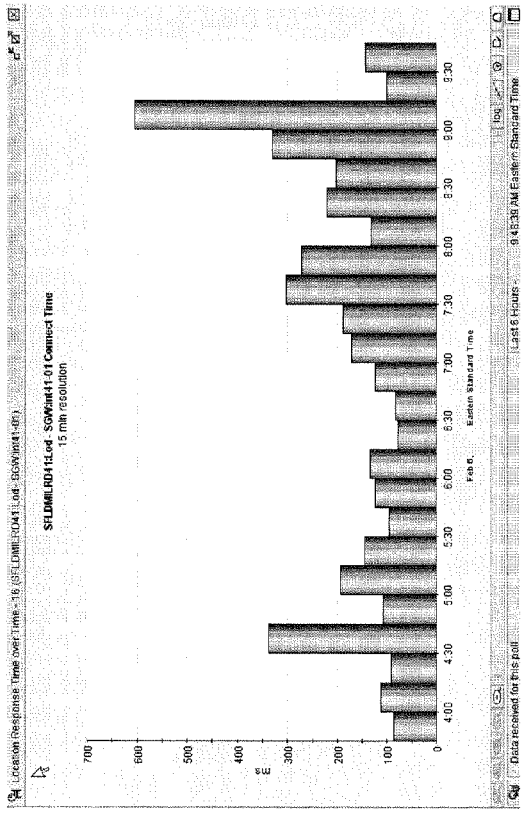

FIGS. 3A-3C are diagrams showing illustrative communication performance statistics for monitored IP address pools. As shown in FIG. 3A, the IP address pool monitor 11 can calculate communication performance statistics for two different networks, the "Wes" and "Lod" networks. In both cases, a high percentage of the monitored responses are successful, and only 4-5% of the overall responses result in failure. However, the high percentage of successful responses observed in each network mask recurrent failures among particular IP address pools within each network. Indeed, as shown in the right-hand portion of the figure, while a majority of responses are successful among most IP address pools, responses are only successful in around 5-10% of instances among certain pools. The IP address monitor can thus be used to identify the particular IP address pools having elevated failure rates. The IP address monitor can thus be used to identify a source of transmission failure through the monitoring of request packets and response packets, the identifying of IP address pools associated with each packet, and the calculating or updating of performance statistics for each pool and for each response type within each pool.

FIG. 3B shows illustrative performance statistics obtained in real-time for a plurality of different IP address pools. In the table of FIG. 3B, each line of the table includes performance statistics for a different IP address pool. The statistics provided in real-time for each IP address pool include numbers of total responses, of successful responses, of failed responses, of retransmissions and lost packets, of timeouts, and of total requests. The statistics also include an average connection time (in ms) and a peak connection time for each pool. Additional or alternative statistics can also be provided.

FIG. 3C shows an illustrative performance statistic for a particular IP address pool plotted over time. The plot of FIG. 3C shows the average connection time associated with the IP address pool in 15 minute increments over the course of several hours. The IP address pool monitor can thus be used to obtain and display performance statistics for an IP address pool over time, so as to identify performance failures that occur in the IP address pool at particular times of day or on a recurring periodic basis.

Functions relating to the monitoring of communication performance of IP address pools may be implemented on computers connected for data communication via a packet data network, such as computers operating as an IP address pool monitor 11 shown in FIG. 1. Although special purpose devices may be used, such devices also may be implemented using one or more hardware platforms intended to represent a general class of data processing device commonly used to run "server" programming so as to implement the performance monitoring functions discussed above, albeit with an appropriate network connection for data communication.

Figure 4:
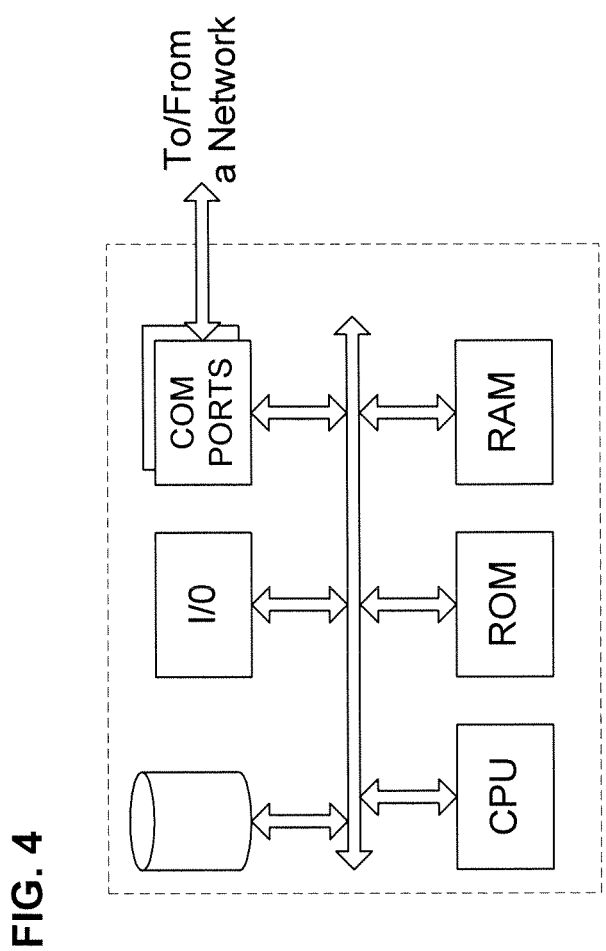
FIG. 4 is a simplified functional block diagram of a computer that may be configured as a host or server, for example, to function as the IP address pool monitor in the system of FIG. 1.

FIG. 4 provides a functional block diagram illustration of a general purpose computer hardware platforms, such as a platform implementing a network or host computer platform used to implement a server. A server, for example, includes a data communication interface for packet data communication to/from the network. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. Of course, the server functions may be implemented in a distributed fashion on a number of similar platforms, to distribute the processing load.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising:
    receiving a first request packet transmitted from a first mobile device through a mobile wireless communication network;
    responsive to receiving the first request packet, storing a first record including a timestamp and information from the first request in an IP address pool monitor communicatively coupled to a communication link between the mobile wireless communication network and a wide area network (WAN);
    receiving a second request packet transmitted from a second mobile device through the mobile wireless communication network;
    responsive to receiving the second request packet, storing a second record including a timestamp and information from the second request in the IP address pool monitor;
    receiving from the WAN a first response packet responsive to the first request;
    responsive to receiving the first response:
        identifying an IP address pool, from among a plurality of IP address pools each including different IP addresses, that includes an IP address of the first mobile device associated with the first request; and
        calculating a performance statistic for the identified IP address pool based on a first parameter measured from the first record and the first response;
    receiving from the WAN a second response packet responsive to the second request; and
    responsive to receiving the second response, updating the performance statistic for the identified IP address pool based on the first parameter and on a second parameter measured from the second record and the second response packet, only upon determining that an IP address of the second mobile device associated with the second request is included in the identified IP address pool.

2. The method of claim 1, further comprising:
    receiving a third request packet transmitted from a third mobile device;
    responsive to receiving the third request packet, storing a third record including a timestamp and information from the third request in the IP address pool monitor;
    receiving from the WAN a third response packet responsive to the third request; and
    responsive to receiving the third response packet:
        identifying a second IP address pool, from among the plurality of IP address pools, that includes an IP address of the third mobile device associated with the third request; and
        calculating a second performance statistic for the second IP address pool based on a third parameter measured from the third record and the third response.

3. The method of claim 2, further comprising:
    upon determining that one of the performance statistic and the second performance statistic has crossed a threshold, generating an alert identifying an IP address pool that is associated with the one of the performance statistic and the second performance statistic having crossed the threshold.

4. The method of claim 1, further comprising:
    receiving a fourth request packet transmitted from the first mobile device;
    responsive to receiving the fourth request packet, storing a fourth record including a timestamp and information from the fourth request in the IP address pool monitor;
    determining that no response packet responsive to the fourth request has been received within a timeout period following receipt of the fourth request; and
    responsive to the determining that no response packet responsive to the fourth request has been received, updating the performance statistic for the identified IP address pool based on the first parameter, the second parameter, and a fourth parameter measured from the fourth record.

5. The method of claim 1, wherein responsive to receiving the first response, the method further comprises:
    retrieving a sequence number from the first response packet;
    determining whether a record, among a plurality of stored records each including a timestamp and information from a received request, is stored in a memory and matches the sequence number from the first response packet;
    upon determining that the record is stored in the memory and matches the sequence number from the first response packet, calculating a parameter from the matching record and the first response packet.

6. The method of claim 1, wherein the performance statistic is calculated based on at least one of a delay between the timestamp of the first record and a timestamp of the first response; a determination that the first response is a retransmission; and an error code retrieved from the first response.

7. The method of claim 1, wherein the receiving of the first request packet comprises receiving from a network tap a copy of a request packet transmitted from the first mobile device through the mobile wireless communication network to a server of the wide area network.

8. The method of claim 7, wherein the network tap is a network tap of a serving gateway (SGW) of the mobile wireless communication network and the receiving of the first request packet comprises receiving from a network tap a copy of a request packet routed through the SGW.

9. A system comprising:
a communication link for carrying communication packets between a mobile wireless communication network and a wide area network (WAN); and
an IP address pool monitor communicatively coupled to the communication link and operative to:
receive a first request packet transmitted from a first mobile device through the mobile wireless communication network;
responsive to receiving the first request packet, store a first record including a timestamp and information from the first request;
receive a second request packet transmitted from a second mobile device through the mobile wireless communication network;
responsive to receiving the second request packet, store a second record including a timestamp and information from the second request;
receive from the WAN a first response packet responsive to the first request;
responsive to receiving the first response:
identify an IP address pool, from among a plurality of IP address pools each including different IP addresses, that includes an IP address of the first mobile device associated with the first request; and
calculate a performance statistic for the identified IP address pool based on a first parameter measured from the first record and the first response;
receive from the WAN a second response packet responsive to the second request; and
responsive to receiving the second response, update the performance statistic for the identified IP address pool based on the first parameter and on a second parameter measured from the second record and the second response packet, only upon determining that an IP address of the second mobile device associated with the second request is included in the identified IP address pool.

10. The system of claim 9, further comprising:
a network tap connected in the communication link between the mobile wireless communication network and the wide area network, and operative to send a copy of each packet communicated between the mobile wireless communication network and the wide area network to the IP address pool monitor while allowing each packet to proceed unimpeded to an intended destination of the packet in the mobile wireless communication network or the wide area network.

11. The system of claim 10, wherein the network tap is a network tap of a serving gateway (SGW) of the mobile wireless communication network.

12. The system of claim 9, wherein the IP address pool monitor comprises a database associating each IP address included in the plurality of IP address pools with the particular IP address pool of the IP address.

13. The system of claim 9, wherein the IP address pool monitor is further operative to:
receive a third request packet transmitted from a third mobile device;
responsive to receiving the third request packet, store a third record including a timestamp and information from the third request;
receive from the WAN a third response packet responsive to the third request; and
responsive to receiving the third response packet:
identify a second IP address pool, from among the plurality of IP address pools, that includes an IP address of the third mobile device associated with the third request; and
calculate a second performance statistic for the second IP address pool based on a third parameter measured from the third record and the third response.

14. The system of claim 13, wherein the IP address pool monitor is further operative to:
upon determining that one of the performance statistic and the second performance statistic has crossed a threshold, generate an alert identifying an IP address pool that is associated with the one of the performance statistic and the second performance statistic having crossed the threshold.

15. The system of claim 9, wherein the IP address pool monitor is further operative to:
receive a fourth request packet transmitted from the first mobile device;
responsive to receiving the fourth request packet, store a fourth record including a timestamp and information from the fourth request;
determine that no response packet responsive to the fourth request has been received within a timeout period following receipt of the fourth request; and
responsive to the determining that no response packet responsive to the fourth request has been received, update the performance statistic for the identified IP address pool based on the first parameter, the second parameter, and a fourth parameter measured from the fourth record.

16. The system of claim 9, wherein responsive to receiving the first response, the IP address pool monitor is further operative to:
retrieve a sequence number from the first response packet;
determine whether a record, among a plurality of stored records each including a timestamp and information from a received request, is stored in memory and matches the sequence number from the first response packet;
upon determining that a record is stored in memory and matches the sequence number from the first response packet, calculate a parameter from the matching record and the first response packet.

17. The system of claim 9, wherein the performance statistic is calculated based on at least one of a delay between the timestamp of the first record and a timestamp of the first response; a determination that the first response is a retransmission; and an error code retrieved from the first response.

* * * * *